US006590061B1

United States Patent
Rypacek et al.

(10) Patent No.: US 6,590,061 B1
(45) Date of Patent: Jul. 8, 2003

(54) FUNCTIONALIZED POLYMERS OF α-AMINO ACIDS AND THE METHOD OF PREPARATION THEREOF

(75) Inventors: Frantisek Rypacek, Prague (CZ); Milan Dvorak, Prague (CZ); Dana Kubies, Kosice (SK); Ludka Machova, Prague (CZ)

(73) Assignee: Institute of Macromolecular Chemistry of the Academy of Sciences of the Czech Republic, Praha (CZ)

( * ) Notice: Subject to any disclaimer, the term of this patent is extended or adjusted under 35 U.S.C. 154(b) by 0 days.

(21) Appl. No.: 09/701,716

(22) PCT Filed: Jun. 3, 1999

(86) PCT No.: PCT/CZ99/00016

§ 371 (c)(1),
(2), (4) Date: Jan. 29, 2001

(87) PCT Pub. No.: WO99/64495

PCT Pub. Date: Dec. 16, 1999

(30) Foreign Application Priority Data

Jun. 5, 1998 (CZ) ........................... PV 1738-98

(51) Int. Cl.$^7$ .............................................. C08G 63/44
(52) U.S. Cl. ........................ 528/288; 528/274; 528/289; 528/290; 528/292; 528/302; 528/422; 525/437; 524/714; 524/722; 524/755
(58) Field of Search ....................... 528/274, 288, 528/289, 290, 292, 302, 422; 525/437; 524/714, 722, 755

(56) References Cited

FOREIGN PATENT DOCUMENTS

| WO | WO 93/25583 | * 12/1993 |
|----|-------------|-----------|
| WO | WO 95/04772 | * 2/1995  |

* cited by examiner

*Primary Examiner*—Samuel A. Acquah
(74) *Attorney, Agent, or Firm*—Notaro & Michalos P.C.

(57) ABSTRACT

Functionalized homopolymers and copolymers of α-amino acids of the general formula 1, wherein X is oxygen or sulphur; $R_1$ could be alkyl, alkenyl, substituted alkyl, aryl or substituted aryl; structure $[A]_n$ represents a poly(amino acid) chain based on α-amino acids or their derivatives with protected functional groups, wherein n could be in the range of 1–500; Y is either OH, or a structure of the formula 2, wherein $R_2$ is H or an amino-acid residue, or a structure of the formula 3, wherein Z and Z' are either NH or O; $R_3$ is a chemical structure selected from alkyls, substituted alkyls, aryls, substituted aryls, or a polymer selected from a group comprising poly(ethylene oxide), poly(propylene oxide) and polybutadiene; P is hydrogen or an acyl group derived from a carboxylic acid selected from the group including alkanoic acids, succinic acid, maleic acid, acrylic acid, phthalic acids and cyclohexane dicarboxylic acids, or it is an acyl selected from a group consisting of compounds according to a general formula 4, wherein $R_4$ is selected from the group including C1 to C5 alkyls, $CH_2$—O—$CH_2$—$CH_2$, $CH_2$—O—$CH_2$—$CH_2$—$CH_2$, and O—$(CH_2)_3$—O, wherein $R_4$ may be the same in all structural units or different and the subscript m means the number of said structural units and may be in the range of 2–800.

A method of manufacturing said polymers, based on the reaction of a mixture comprising the monomers, a base catalyst and an initiator in an aprotic solvent, wherein the monomer is either a single α-amino-acid N-carboxyanhydride or a combination of N-carboxyanhydrides, and the initiator is a compound of a general formula 5, wherein X is oxygen or sulphur, $R_1$ is a radical from the group comprising C1–C20 alkyls, C2–C20 alkenyls, substituted alkyl, aryl or substituted aryl, arylalkyl and substituted arylalkyl; $R_5$ is hydrogen, or C1 to C5 alkyl; $R_5'$ is hydrogen, or C1 to C5 alkyl, aryl, arylalkyl or substituted alkyl; wherein the ratio of monomer/initiator (mol/mol) is in the range of about 2 to 1000, preferably within the range of 5 to 300, and the ratio of monomer/catalyst (mol/mol) is in the range of about 1 to 500, preferably within the range of about 5–300.

48 Claims, 1 Drawing Sheet

(1)

(2)         (3)

(4)

(5)

FUNCTIONALIZED POLYMERS OF α-AMINO ACIDS AND THE METHOD OF PREPARATION THEREOF

TECHNICAL FIELD

The invention deals with functionalised polymers, containing structural unites derived from α-amino acids and with the method of preparation thereof, providing the said polymers with a narrow distribution of molecular parameters and with well-defined functional groups.

BACKGROUND ART

Synthetic polymers of α-amino acids, poly(AA), contain peptide bonds in the main chain and can be composed of the same structural units (α-amino acids) as the poly(amino acid)s of natural origin, such as polypeptides and proteins. In this regard they may be considered as being protein analogues. In living systems, a combination of twenty amino acids provides for a vast number of structurally defined polymers, proteins, which fulfill essential functions in the living systems, thanks to their unique molecular structures. Uniqueness of molecular structure in proteins is a result of biosynthetic process of template polymerisation, leading to polymer product composed of molecules with identical composition and three-dimensional molecular structure.

Available methods for the synthesis of poly(AA) still remain far behind the specificity of the template-controlled polymerization in living systems and, usually, they provide heterogeneous mixtures of polymer molecules with statistical distributions of structural-units composition and polymer-chain lengths. The heterogeneity in the composition and molecular parameters constitutes the main difference between the synthetic poly(AA) and proteins. Similarly to other synthetics, the heterogeneity of the synthetic poly (AA) greatly limits their capability to form defined supramolecular structures and to be involved in molecularly specific interactions, typical for living systems. Therefore, great effort of modern macromolecular chemistry is concerned with the application of controlled polymerization processes to the synthesis of well-defined polymers with narrow distributions of molecular parameters, which would be suitable to form supramolecular structures with specific properties. One of the important approaches in this field is based on the synthesis of block copolymers which, in one molecule, combine polymer chains with different chemical and/or physical properties. Besides important technical applications of block copolymers for the modification of mechanical properties of polymer materials, well-defined block copolymers form spontaneously associated structures, organized molecular layers and supramolecular structures with novel properties. Because of these qualities, well-defined block copolymers attract increased attention of scientists and open new opportunities for commercial use.

Bloc copolymers of α-amino acids, despite of their potential of being analogues of specific biopolymers, have not yet been used in a significant commercial application. The reason for that rests in the lack of suitable synthetic methods providing, in a practically convenient process, poly(AA) with a narrow distribution of molecular parameters and with functional end-groups suitable to make either a block copolymer or be used in other chemical modifications. Synthetic poly(AA) are usually prepared by ring-opening polymerisation of N-carboxyanhydrides (NCA) of respective α-amino acids. There is a large amount of literature describing the synthesis of various poly(AA). A comprehensive review of known reactions leading to the polymerization of NCA and/or the reactions accompanying the polymerisation is provided in the book by Kricheldorf (Kricheldorf H. R. α-Amino-acid-N-carboxyanhydrides and related heterocycles. Synthesis, properties and polymerisation. Springer Verlag, Berlin, 1987). These known procedures are based on two mechanisms of NCA polymerisation.

When so called amine mechanisms applies, the polymer chain propagates through a nucleophile group, usually amine, as the polymer chain end-group. This mechanism comes into effect when the polymerisation is initiated by a protic nucleophile, typically, a primary amine. The protic nucleophiles initiate the NCA polymerisation through the reaction with C-5 carbonyl of NCA ring. The opening of NCA ring provides carbamic acid which decarboxylates, yielding free amino-group as an end-group and carbon dioxide. Free amino group acts as a nucleophile, attacks another NCA molecules and in this way the polymer chain propagates. The properties of the resulting polymer product are dependent on the extent of side reactions. One of these reactions involves formation of a carbamate anion end group, which affects the reaction kinetics. Another side reaction, particularly important in polymerisation of esters of dicarboxylic amino acids, such as glutamates and aspartates, is the reaction of the nucleophile end-group with the side-chain ester in the last structural unit. This reaction leads to the loss of the terminal nucleophile group and, consequently, to the termination of the polymer chain. Due to side reactions, the resulting polymer product is heterogeneous, often with a bimodal molecular-weight distribution, and the structure polymer-chain end groups is uncertain.

Another mechanism of NCA polymerisation is the activated-monomer mechanism. This mechanism comes into effect when the polymerisation is initiated by a base, which cannot act as a nucleophile, e.g. a tertiary amine. Through the reaction of the base with the monomer (NCA), nitrogen in the NCA ring becomes deprotonated. The resulting NCA anion attacks another NCA molecule giving rise to a dimer containing a highly reactive N-acylated NCA group at one end, and a nucleophile carbamate group at the other. The chain propagation takes place through the reaction of another NCA anion (activated monomer) with the highly reactive N-acyl-NCA group. By perpetuation of this step the polymer chain growths rapidly, while the initiation of other polymer chains still proceeds through the much slower reaction of NCA anion with non-acylated monomer. Due to this kinetic course, a high-molecular-weight product is formed already at the early stages of monomer conversion and the resulting product has a wide molecular-weight distribution, and its final polymerisation degree is proportional neither to monomer conversion nor to a monomer-to-initiator ratio. The presence of another growing center, i.e. a nucleophile group at the other polymer chain, which allows for the propagation of the polymer by amine mechanism, represent another complicating factor. Consequently, the molecular parameters as well as the structure of the terminal functional groups cannot be controlled.

In spite of the numerous techniques described in the prior art, the prior art does not offer a method for obtaining poly(AA) with sufficiently low heterogeneity of molecular parameters and with defined functional end groups, which could be efficiently used in formation of biologically specific supramolecular assemblies and polymer materials.

We have found recently that the side reactions in the polymerisation of NCA can be significantly suppressed by using a initiating system, which prevents the formation of the second growing center and allows the polymer chain to growth predominantly, or exclusively, on prepared growing centers with known structure. In addition to that, we found that through the limitation of the propagation reaction to only one mechanism, the polymerisation conditions can be applied, at which it is possible to control the polymerisation degree of the growing polymer to obtain poly(AA) with desired polymerisation degree and narrow molecular-weight distribution. We also found, that while it is possible to select the structure of initiating system from a wide range of suitable amino-acid derivatives, it is also possible to select the structure of the initial, i.e. N-end terminal structural unit of poly(AA). Application of these new discoveries makes it possible to synthesize poly(AA) with desired narrow distribution of molecular parameters and with defined functional end groups, which are suitable for further chemical modification or for preparation of well-defined block copolymers. The functionalised polymers and block copolymers according to this invention can be used in various commercial applications as described above.

Object of the Invention

It is, therefore, the object of this invention to provide for polymers of α-amino acids with narrow distribution of molecular weight and with defined functional groups at the polymer chain ends.

It is another object of this invention to provide a method for the synthesis of poly(amino acid)s with controlled molecular-weight distribution and for the controlling the average molecular weight of the final polymer product.

It is another object of this invention to provide a process for introduction of selected functional groups to the polymer chain ends and thus provide for homo-telechelic or hetero-telechelic polymers suitable for the synthesis of block copolymers containing poly(amino acid) segments

DESCRIPTION OF THE PREFERRED EMBODIMENTS OF THE INVENTION

Figure 1:
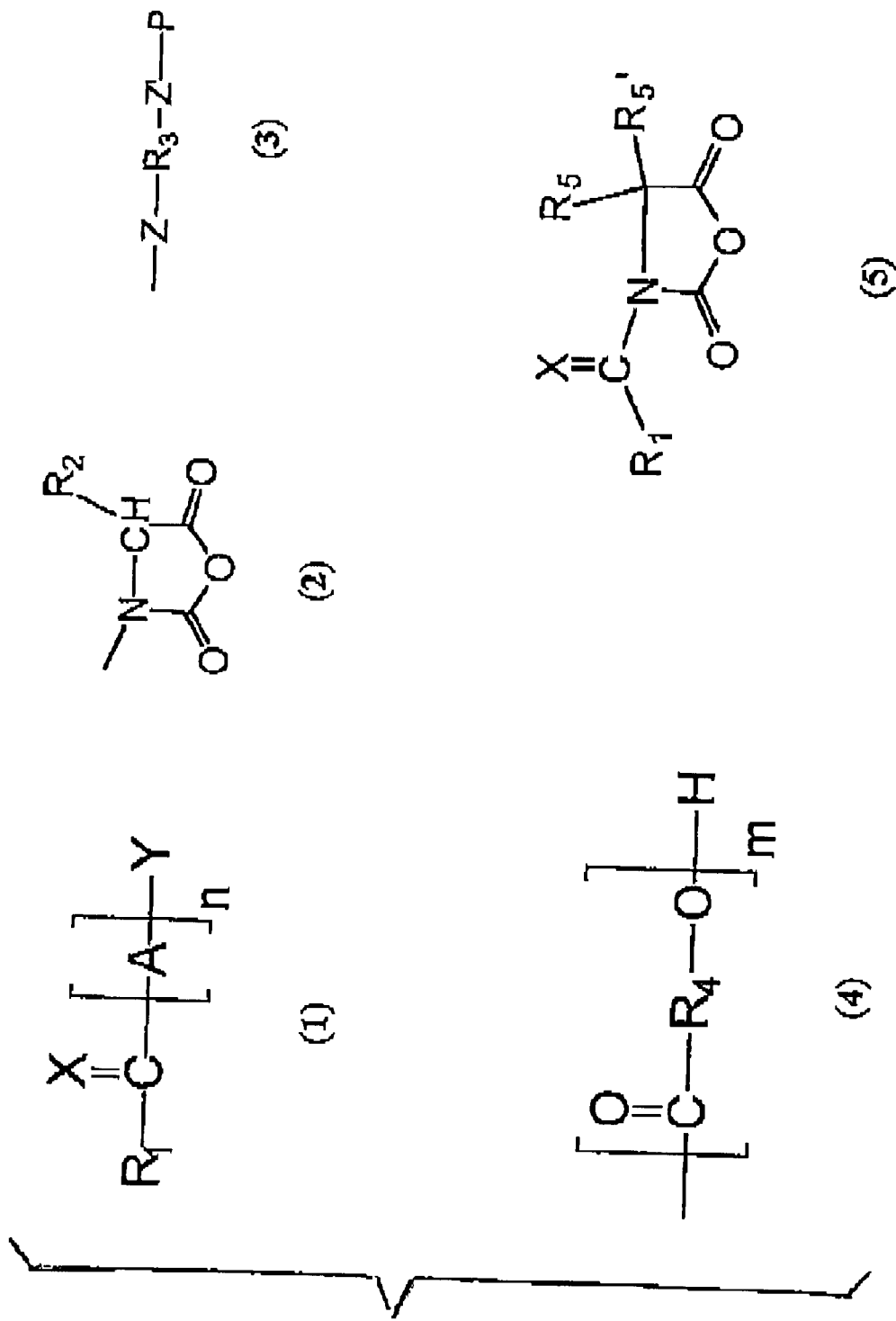
FIG. 1 is a drawing showing five formulas forming parts of the present invention.

The present invention provides for functionalised homopolymers and copolymers of α-amino acids of the formula (1),

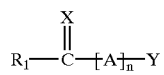

(1)

wherein X is oxygen or sulphur,
R$_1$ is a radical selected from the group including C1–C20 alkyls, C2–C20 alkenyls, substituted alkyl, such as t-butoxyl, aryl or substituted aryl, such as phenyl, 4-nitrophenyl, 3,5-dinitrophenyl, arylalkyl and substituted arylalkyl, such as benzyl, benzyloxyl, 9-fluorenylmethoxyl;
structure [A]$_n$ represents a poly(amino acid) chain composed of one type or of a combination of more than one type of structural units of α-amino acids or their derivatives with protected functional groups, connected by peptide bonds in the way depicted by formula (2),

(2)

wherein R$_2$ represents the residue of respective amino acid or its derivative, n means the number of amino acid structural units in the chain and may be in the range of 1 to 500, preferably within the range of 5–200;
Y is either OH, or a structure of the formula (2a),

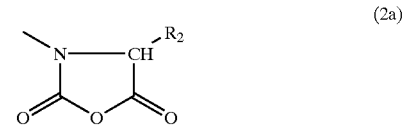

(2a)

wherein R$_2$ is H or an amino-acid residue selected from a group consisting of α-amino acids and their derivatives described above, or Y is a structure of the formula (3),

(3)

wherein Z and Z' is either NH or O; R$_3$ is a chemical structure selected from C2 to C20 alkyls, substituted alkyls, aryls or substituted aryls, or it is a polymer selected from a group including poly(ethylene oxide), poly (propylene oxide) and polybutadiene; P is hydrogen or an acyl group derived from a carboxylic acid selected from the group including alkanoic acids, succinic acid, maleic acid, acrylic acid, phthalic acids and cyclohexane dicarboxylic acids, or it is an acyl selected from the group comprising compounds according to a general formula (4),

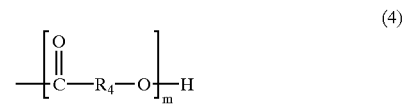

(4)

wherein R$_4$ is selected from the group including C1 to C5 alkyls, CH$_2$—O—CH$_2$—CH$_2$, CH$_2$—O—CH$_2$—CH$_2$—CH$_2$, and O—(CH$_2$)$_3$—O, wherein R$_4$ may be the same in all structural units or different and the subscript n means the number of said structural units and may be in the range of 2–800, preferably within the range of 8–300.

It is an important feature of the present invention that the structure [A]$_n$ represent a poly(amino acid) chain, that may be composed of either one or of a combination of α-amino-acid structural units selected from the group comprising glycine, alanine, valine, leucine, isoleucine, phenylalanine, tryptophane, threonine, methionine, lysine, ornithine, arginine, histidine, serine, asparagine, glutamine, tyrosine, cysteine, aspartic acid, glutamic acid, 2,3-diaminopropionic acid, 2,4-diaminobutyric acid, and their analogues and substituted derivatives.

The polymers according to this invention are further characterized by the fact that the α-amino-acid derivatives suitable as structural units forming the structure $[A]_n$ may be conveniently selected from the group comprising β-alkyl-esters and β-alkyl-amides of aspartic acid, wherein the alkyl may be substituted or unsubstituted C1–C18 alkyl. Suitable derivatives of this type are β-methyl aspartate, β-cholesteryl aspartate, β-t-butyl aspartate, β-benzyl aspartate, β-allyl aspartate and β-(2,2,2-trichlorethyl)aspartate, N-(2-hydroxyethyl)asparagine, N-hydroxypropyl asparagine, N-hydroxybutyl asparagine, etc.

The polymers according to the present invention are also characterized by the fact that the α-amino-acid derivatives suitable as structural units forming the structure $[A]_n$ may be conveniently selected from the group comprising γ-alkyl-esters and γ-alkyl-amides of glutamic acid, wherein the alkyl may be substituted or unsubstituted C1–C18 alkyl. Suitable derivatives of this type are γ-methyl glutamate, γ-cholesteryl glutamate, γ-t-butyl glutamate, γ-benzyl glutamate, γ-allyl glutamate and γ-(2,2,2-trichloroethyl)glutamate, N-(2-hydroxyethyl)glutamine, N-hydroxypropyl glutamine, N-hydroxybutyl glutamine, etc.

The α-amino-acid derivatives forming the structure $[A]_n$ may also be selected from a group comprising $N_\epsilon$-t-butoxycarbonyl-L-lysine, $N_\epsilon$-benzyloxycarbonyl-L-lysine, $N_\epsilon$-allyloxycarbonyl-L-lysine, $N_\epsilon$-phthalimido-L-lysine, $N_\delta$-t-butoxycarbonyl-L-ornithine, $N_\delta$-benzyloxycarbonyl-L-ornithine, $N_\delta$-allyloxycarbonyl-L-ornithine, $N_\delta$-phthalimido-L-ornithine, $N_\gamma$-t-butoxycarbonyl-2,4-diaminobutyric acid, $N_\gamma$-benzyloxycarbonyl-2,4-diaminobutyric acid, $N_\gamma$-allyloxycarbonyl-2,4-diaminobutyric acid, $N_\gamma$-phthalimido-2,4-diarninobutyric acid, $N_\beta$-t-butoxycarbonyl-2,3-diaminopropionic acid, $N_\beta$-benzyloxycarbonyl-2,3-diaminopropionic acid, $N_\beta$-allyloxycarbonyl-2,3-diaminopropionic acid, and $N_\beta$-phthalimido-2,3-diaminopropionic acid.

In polymers according to the present invention, at least on of the structural forming the structure $[A]_n$ may be arginine or an arginine derivative substituted on the guanidine group, e.g. $N_\delta$, $N_\epsilon$-bis-benzyloxycarbonyl-L-arginine.

In polymers according to the present invention, at least one of the structural units forming the structure $[A]_n$ may be serine, or a serine derivative substituted at hydroxyl group, such as O-t-butyl serine, O-benzyl serine, O-triphenylmethyl serine (O-trityl serine), and O-allyl serine.

In polymers according to the present invention, $R_1$ from the formula (1) may be selected from a group comprising substituted alkyls, alkenyls, aryls and arylalkyls. Examples of suitable structures comprise methyl, allyl, phenyl, 4-nitrophenyl, 3,5-dinitrophenyl, benzyl, benzyloxyl, t-butoxyl, allyloxyl and fluorenylmethoxyl.

Another feature of polymers according to the present invention is based on the fact, that P may be a polymer acyl selected from a group comprising poly(L-lactide), poly(D,L-lactide), copolymers poly(L-lactide-stat-D,L-lactide), polyglycolide, copolymers poly(lactide-stat-glycolide), poly(ε-caprolactone) and copolymers containing structural units derived from ε-caprolactone and those derived from lactide and glycolide.

The invention also comprises polymers having the general formula (1), wherein the groupings $R_1$—(C=X)— is replaced by hydrogen.

The present invention provides a method for the preparation of above described polymers. According to the present invention, the polymers are prepared by reacting a mixture comprising monomers, a base catalyst and an initiator in a solution of an aprotic solvent for the time necessary to complete the reaction, and isolating the resulting polymer product.

According to the present invention the monomer may be either a single N-carboxyanhydride (NCA) or a combination of NCAs of the selected α-amino acids. The initiator is a compound of general formula (5),

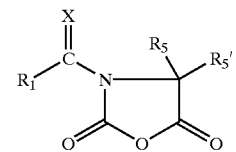

(5)

wherein X is oxygen or sulphur, $R_1$ is a radical from a group comprising C1–C20 alkyls, C2–C20 alkenyls, substituted alkyl, such as t-butoxyl, aryl or substituted aryl, such as phenyl, 4-nitrophenyl, 3,5-dinitrophenyl, arylalkyl and substituted arylalkyl, such as benzyl, benzyloxyl, 9-fluorenylmethoxyl; $R_5$ is hydrogen, or C1 to C5 alkyl; $R_5'$ is hydrogen, or C1 to C5 alkyl, aryl, arylalkyl or substituted alkyl, The ratio of monomer/initiator (mol/mol) may be in the range of 2 to 1000, preferably within the range of 5 to 300, and the mole ratio of monomer/catalyst is in the range of about 1 to 500, preferably within the range of 5–300.

Carrying out the process of the preparation of polymers according to the present invention the mixture of the monomer in a suitable ratio with the initiator and catalyst is reacted in a suitable solvent at selected temperature for the time necessary to attain desired degree of conversion and the resulting polymer product is either isolated by usual procedures, or used in situ as an intermediate for subsequent reaction steps, including modification reactions of functional end-groups and functional groups in the side chains.

According to the present invention suitable monomers are N-carboxyanhydrides (NCA) of α-amino acids. Suitable α-amino acids are those selected from the group comprising natural α-amino acids, such as glycine, alanine, valine, leucine, isoleucine, phenylalanine, tryptophane, threonine, methionine, and their analogues and substituted derivatives, e.g. halogen derivatives, such as pentafluorophenyl alanine, fluoroleucine, etc., and derivatives of α-amino acids with protected functional groups, such as β-methyl aspartate, β-cholesteryl aspartate, β-t-butyl aspartate, β-benzyl aspartate, β-allyl aspartate and β-(2,2,2-trichlorethyl)aspartate, γ-methyl glutamate, γ-cholesteryl glutamate, γ-t-butyl glutamate, γ-benzyl glutamate, γ-allyl glutamate and γ-(2,2,2-trichlorethyl)glutamate, $N_\epsilon$-benzyloxy-carbonyl-L-lysine, $N_\epsilon$-allyloxycarbonyl-L-lysine, $N_\epsilon$-phthalimido-L-lysine, $A_\delta$-benzyloxy-carbonyl-L-ornithine, $N_\delta$-aLlyloxycarbonyl-L-ornithine, $N_\delta$-phthalimido-L-ornithine, $N_\delta$, $N_\epsilon$-bis-benzyloxycarbonyl-L-arginine, O-t-butyl serine, O-benzyl serine, and O-allyl serine, etc.

NCA of said α-amino acids can be prepared by methods generally known to those skilled in the art. The amino acids containing, besides the groups on α-carbon, other functional protic groups, e.g., lysine, ornithine, arginine, serine, tyrosine, aspartic acid and glutamic acid, have to be first protected by suitable protecting groups. Suitable protecting groups in the synthesis of NCAs from functional amino acids are those stable in acidic conditions. Examples of such groups comprise alkyl esters for protection of carboxylic groups of aspartic and glutamic acids, alkylether groups for protection of hydroxyl groups or urethane groups for protection of amino groups. The suitable compounds and reactions yielding protected amino acids are generally well-known to those skilled in the art.

According to the present invention, suitable initiators are compounds of the general formula (5),

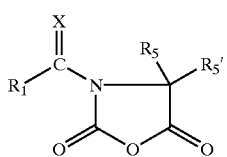

(5)

wherein X is oxygen or sulphur;

$R_1$ is a radical selected from the group comprising C1–C20 alkyls, C2–C20 alkenyls, substituted alkyl, such as t-butoxyl, aryl or substituted aryl, such as phenyl, 4-nitrophenyl, 3,5-dinitrophenyl, arylalkyl and substituted arylalkyl, such as benzyl, benzyloxyl, 9-fluorenylmethoxyl;

$R_5$ and $R_5'$ is hydrogen, or C1 to C5 alkyl, aryl, arylalkyl or substituted alkyl, such as 2-(benzyloxycarbonyl) ethyl, (benzyloxycarbonyl)methyl, 2-(t-butyloxycarbonyl)ethyl, t-butyloxycarbonyl-methyl, 4-(benzyloxycarbonylamido)butyl, 3-(benzyloxycarbonyl-amido)propyl, 2-(triphenylmetoxy)ethyl, 2-(t-butoxy)ethyl, 2-(benzyloxy)ethyl, etc.

These compounds are either commercially available or can be prepared by procedures known from the prior art.

In the process according to the present invention, suitable catalysts are bases, which are capable of accepting proton from the nitrogen of the NCA ring, while they are not capable to ract as nucleophiles and forrn a covalent bond with C5 (or C2) carbon atom of the NCA ring, either due to the lack of free valence or due to steric hindrance. Sitable bases of this type are tertiary amines, such as triethylatnine, tributylaamine, N-methylmorpholine, or sterically hindered secondary amines, such as N,N-diisopropylamine, N,N-dicyclohexylarnine, etc.

In the process according to the present invention, suitable solvents are aprotic solvents, free of water and any other protic impurities, in which the reactants, or the reaction product, or, preferably, all the reaction components are sufficiently soluble. Example of suitable solvents include halogenated hydrocarbons, such as dichlormethane, dichlorethaneand chloroform, ethers, such as tetrahydrofuran and dioxan, aromatic solvents, such as benzene, toluene, and polar solvents, such as dimethylformamide, dimethylsulphoxide, and mixtures of said solvents in suitable ratios. The choice of a suitable solvent depends on the structure and solubility of reaction components and can be made, based on the experience in the field.

The main features of the process according to the present invention are based on the mechanism by which the reaction components interact. We have found that the reaction of compounds of general formula (5) with the monomer, NCA, in the presence of a base catalyst is much faster that the reaction between two monomer molecules. We have also found that the increase in the reaction rate is not due to the higher electrophility of C5 carbon of NCA ring, but rather due to a joint interaction of compound (5) with an ion-pair formed by the monomer and base catalyst. It means, that the compound (5) can be sufficiently stable against unwanted attack by a nucleophile, and its higher reactivity comes into effect only when it is contacted with the activated monomer (monomer-base ion pair). This feature make it possible to use the compound with general formula (5) as a convenient initiator of the NCA polymerisation. Addition of compound 5 to the reaction mixture provides for a defined molar amount of reactive centers, on which the polymer chains start to grow.

It is the presence of carbonyl (thiocarbonyl) group as a substituent on the nitrogen atom of the initiator, which is of key importance for the initiator function, whereas the structure of radical $R_1$ is less important. The reaction of the initiator with monomer provides N-acylated NCA group, in which the configuration on the nitrogen atom of the N-acylated NCA ring repeats that described by formula (5). This N-acylated NCA end group reacts with another monomer-catalyst pair in the same way as it was described above for the reaction of the initiator. By perpetuation of this step the polymer chain propagates N-acylated NCA group as a unique growing center. Its structure can be described by a general formula (5) in which $R_1$ represents the growing polymer chain.

The application of this procedure makes it possible to limit the propagation reaction to one mechanism, while the other end of the polymer chain remains protected by the radical $R_1$ of the original initiator. By this way it is possible to control the polymerisation degree of the growing polymer chain by the monomerinitiator ratio and thus to obtain polymers with desired polymerisation degree. Because all the growing centres are present in the reaction mixture at the beginning of the reaction, all polymer chains start to grow simultaneously and the resulting product exhibits very narrow molecular-weight distribution. These features of the procedure according to the invention will be further demonstrated by examples.

Another important feature of the procedure according to the present invention is based on the fact, that the structure of the initiating system can be selected from a broad scale of suitable α-amino-acid derivatives, thus making possible to select the structure of the initial structural unit, i.e. N-terminal structural unit of the resulting poly(AA). In addition, the selection of suitable substituent $R_1$ makes it possible to prepare polymers with defined end groups. For instance, a polymer with a lipophilic end group can be prepared by using an initiator, in which $R_1$ is selected from the group of higher alkyls. Alternatively, the structure of $R_1$ can be selected such as to be cleaved from the prepared polymer chain under mild conditions, resulting in a free amine end-group, which, subsequently, can be used for further modification reactions. Suitable initiators of this type are compounds with general formula (5), wherein $R_1$ is selected from the group comprising alkoxy groups, such as benzyloxy, t-butoxy, allyloxy and 9-fluorenylmethoxy group.

The process according to the present invention can be carried out in various modifications, which will become obvious to those, skilled in the art. In one modification, all the designed amount of the monomer can be added in one dose at the beginning of the reaction. Depending whether the monomer comprise NCA from one type of amino acid only or a mixture of NCAs from different type of amino acids, the resulting polymer will be either a homopolymer, composed of one type of structural units only, or a statistical copolymer composed of corresponding amino-acid structural units, respectively.

By using another modification of the process of this invention, the reaction can be carried out in steps, first reacting to a certain amount of one monomer to a desired degree of conversion and after that another dose of the monomer, either of the same type or another one, can be added and the reaction can continue by the second step. Through the appropriate application of this procedure, either partial or regular block copolymers can be obtained.

The kinetic course of the polymerization reaction can be controlled by the amount and type of base catalyst. The catalyst can be added either in one dose at the beginning of the polymerisation or it can be added in several doses during the course of the reaction, e.g. in correlation with the stepwise addition of the monomer.

It is an important feature of the process according to the present invention that the growing polymer chains propagate a "living" reactive end-group, i.e. N-acyla-NCA, which remains available for the reaction for a significant period of time, even after all the monomer has reacted. Taking advantage of reactivity of the "living" end-group, the growing chains can purposely be terminated through the reaction with a suitable nucleophile, thus converting N-acyl-NCA to a stable functional end-group. In this way, through the reaction with bifunctional nucleophiles such as diaminoalkanes or aminoalkanols, it is feasible to prepare poly(AA) with a nucleophile group at the C-terminus. As a nucleophile, the method can provide either amine, if diaminoalkane was used, or hydroxyl group, if amino alcohols or diols were used.

When bifunctional nucleophiles are used to quench the living N-acyl-NCA end-group, it is particularly convenient to use their monosubstituted derivatives, in which one of the nucleophile groups is protected. Examples of suitable derivatives include N-t-BOC-1,2-diaminoethane, N-t-BOC-1,3-diaminopropane, N-t-BOC-1,4-diaminobutane, N-t-BOC-1,5-diaminopentane, and N-t-BOC-1,6-diaminohexane, and analogous derivatives with benzyloxycarbonyl, allyloxycarbonyl and fluorenylmethoxycarbonyl protecting groups.

Another types of nucleophiles suitable to react with the terminal N-acyl-NA group may be chosen from α,ω-telechelic polymers containing nucleophile functional groups such as hydroxyl or amine groups. Examples of suitable polymers can be selected from the group comprising polyethers, such poly(ethylene glycol), mono-methoxy-poly (ethylene glycol), poly(propylene glycol), α,ω-diamino-poly(ethylene oxide), α-methoxy-ω-amino-poly(ethylene oxide), α,ω-functionalized polybutadienes, such as α,ω-dihydroxy-polybutadiene, α,ω-diarnino-polybutadiene, etc. The polymers with α,ω-functional groups are usually comrnercially available in various molecular-weight ranges, or they can be prepared by procedures well-known to those, skilled in the art. For the process according to this invention, suitable polyethers are those in the range of molecular weight 300 to 120,000, preferably in the range of 1200 to 30,000. Suitable polybutadiene derivatives may have molecular weightin the range of 300 to 20,000, preferably in the range of 600 to 12,000.

After the "living" N-acyl-NCA end-group has reacted with a protected bifunctional nucleophile the protecting group can be removed by any of the suitable deprotecting reaction. Examples of suitable reactions include the reaction with trifluoracetic acid, removing the t-BOC protecting group, the reaction with piperidine removing the fluorenylmethoxycarbonyl protecting group, catalytic hydrogenation for removing the benzyloxycarbonyl protecting group. Suitable protected derivatives of bifunctional nucleophiles are commercially available in large variety or they can be prepared by well-known methods.

Polymers with nucleophile end-groups can be conveniently used as intermediates in further modification reactions. Nucleophiles such as amine groups or hydroxyl groups can be involved in acylations and alkylations. For instance, these groups can initiate polymerisation of NCA and thus be acylated by resulting polymer chain, which propagates by amine mechanism. In another example, protic nucleophiles such as amines or hydroxyl groups, can initiate the polymerisation of lactones in the presence of suitable catalysts, thus being acylated by the growing polylactone chain (polyester).

It can be percived from the description of the invention, that by combining the described procedures, heterotelechelic poly(AA) with different functional groups at the ends, block copolymers with segments composed of different types of amino acids, and block copolymers with segments composed of polymers with different backbone structures can be prepared.

Thus according to the procedure of the present invention, block copolymers containing poly(AA) blocks and polyester blocks can be prepared by using poly(AA) with amine or hydroxyl groups at one or both ends of the polymer chain, as a macromolecular initiator in the ring-opening polymerisation of suitable lactone. Suitable lactones within the scope of this invention can be selected from the group comprising L-lactide, D,L-lactide, glycolide, s-caprolactone, butyrolactone, valerolactone, 2,5-dioxepan-oone, trimethylene carbonate, etc.

Suitable catalysts for the synthesis of block copolymers with polyester blocks are those generally known in the field of ring-opening polymerisation of lactones. Examples of suitable catalysts include carboxylates and alkoxides of transition metals, such as tin(II) octanoate, Al-alkoxides, etc. These catalysts as well as conditions for their use are generally known.

Another important feature of the polymers according to the present invention is based on the fact, that they can be composed from chain segments with different structure and physical properties, while all the components of the copolymers can be derived from natural compounds, such as natural amino acids or hydroxyacids. This feature make these polymers particularly suited for applications in which biologically degradable and metabolizable polymers are needed. Primarily, such applications could be in biomedical and/or pharmaceutical preparations.

The above description defines the main features of the present invention. The following non-limiting examples are offered in order that those skilled in the art may more readily understand the present invention and the specific preferred embodiments thereof.

EXAMPLES

Example 1

β-benzyl aspartate N-carboxyanhydride (BzlAsp-NCA) (3,0 g, 12 mmol) and N-acetyl-Gly-NCA(0.142 g, 1 mmol) were dissolved in dry dichloroethane (DCE) (300 ml) and diisopropylamine (101 mg, 1 mmol) was added to the solution. The reaction mixture was stirred for 30 min at room temperature and 2-aminoethanol (122 mg, 2 rnmol) in DCE solution (50 ml) was added. After 1 h the reaction mixture was acidified with diluted hydrochloric acid and the product isolated by precipitation into a methanol/water mixture. The polymer isolated by filtration was reprecipitated from dimethylformarnide (DMF) to diethylether, washed and dryied (yield: 88% of calculated amount). The NMR analysis of the product indicated the structure of formula (1) wherein $R_1$ is methyl, X is oxygen, Y is 2-hydroxy-ethylamine group and the structure $[A]_n$ is poly(benzyl L-aspartate) with polymerisation degree of 11 (n=11). The molecular parameters determined by gel permeation chromatography (GPC) were such as $\overline{M}_w=2700$, $\overline{M}_n=2280$, pd =1.18.

Example 2

Samples of poly(Bzl L-Asp) with different molecular weight were prepared by the procedure described in Example 1, using reaction mixtures with different monomer/initiator ratios. Bzl-L-AspNCA and N-acetylglycine NCA were used as a monomer and initiator, respectively. The polymerisation reaction started by addition of catalyst (dicyclohexylamine) in the molar amount equivalent to that of the initiator. The polymerisation was terminated after 2 h by addition of t-butylamine. The polymers were isolated by precipitation. The molecular parameters have been determined from GPC data, the structure and composition have been analysed by NMR and amino-acid analysis. The parameters of resulting polymers are summarised in Table 1. It is worth noticing that all polymers exhibit narrow molecular-weight distribution (MWD) and that the molecular parameters of polymers can be controlled through the monomer/initiator ratio. The ratios of t-butyl and glycine with respect to Asp units structures indicate that, in average, each polymer chain contain a glycine unit at one end and a t-butyl unit at the other.

TABLE 1

The molecular parameters of poly(Bzl-L-Asp) prepared by the procedure of Example 2. Relationship between the molecular parameters of poly(Bzl-L-Asp) and molar ratio of Bzl-Asp NCA and N-acetylglycine NCA ([M]/[I]) in the reaction Mixture.

Example 3

Poly(Bzl L-Asp) prepared according to Example 1 (2.28 g, 1 mmol with respect to hydroxyethyl end groups) and D,L-lactide (5 g, 35 mmnl) were put into a glass ampoule and tin(H) octanoate '0.7 mmol) and dry dioxane (35 ml) were added under dry nitrogen. The ampoule was sealed under vacuum and the polymerisation was carried out for 72 h at 60° C. The product was dissolved in dichloromethane and isolated by precipitation into methanol. The obtained polymer exhibited an unimodal MWD by GPC and its composition, determined from NoM spectra, corresponded to a block copolymer composed of poly(Bzl L-Asp), block A, and poly(latic acid), block B, in which A and B are connected via 2-hydroxy-ethylamine group. The structure of the copolymer thus corresponds to the compound with general formula (1) in which $R_1$ is methyl, X is oxygen, ([A]$_n$ is poly(Bzl L-Asp) with polynrierisation degree of 11 (n=11), Y is a structure with a general formula (3) in which Z is NH, Z' is O, $R_3$ is $CH_2$—$CH_2$ and P is a polymer of lactic acid according to formula (4), in which R4 is $CHCH_3$ and m=80.

| [M]/[I] | Monomer conversion % | Gly/Asp | t-bu/Gly | $\overline{M}_w$ | $\overline{M}_n$ | pd ($\overline{M}_w/\overline{M}_n$) |
|---|---|---|---|---|---|---|
| 12 | ~100 | 11.5 | 0.92 | 2700 | 2280 | 1.18 |
| 25 | ~100 | 27 | 0.94 | 5600 | 4850 | 1.15 |
| 50 | 97 | 49 | 1.08 | 10900 | 9670 | 1.13 |
| 100 | 96 | 91 | 1.10 | 22650 | 18900 | 1.20 |
| 200 | 86 | 170 | 0.90 | 39000 | 28550 | 1.37 |

Example 4

To a solution of γ-benzyl L-glutamate NCA (Bzl-GluNCA) (2.63 g, 10 mmol) and N-acetylglycine NCA(14.5 mg, 0.1 mmol) in DCE diisopropylamine (19.6 mg, 0.2 mmol) was added. After 120 mi of the reaction L-phenylalanine NCA (382 mg, 2 mmol) was added together with another portion of diisopropylamine (10 mg, 0.1 mmol). The reaction was carried out for another 4 h and then it was terminated by addition of t-butylamine. The polymer was isolated by precipitation into diethylether, reprecipitated from DMF and dried in vacuum. The analysis of composition and the molecular weight corresponded to a block copolymer Ac-Gly-[Bzl-Glu]$_{92}$-Phe$_{16}$-N-C(CH$_3$)$_3$.

Example 5

To a solution of dodecyl L-glutanate NCA (DDG) (3.41 g, 10 mmol) and N-acetylglycine NCA (29 mg, 0.2 mmol) in a mixture of DCE/benzene diisopropylamine (20 mg, 0.2 mmol) was added and the reaction was carried out at room temperature. After 4 h, γ-2,2,2-trichloroethyl L-glutamate NCA (TCEG) (3.04 g, 10 mmol) and diisopropylamine (20 mg, 0.2 mmol) were added to the reaction mixture and the reaction was left to continue for another 4 h. The resulting polymer was isolated by precipitation into diethylether and dried. The analysis of composition indicated the structure of a block copolymer Ac-Gly-[DDG]$_{44}$-[TCEG]$_{36}$.

Example 6

To a solution of Bzl-GluNCA (6 g, 0.0228 mol) and N-t-BOC-glycine NCA (Fluka, Cat.No.: 15428) (0.36 g, 0.0018 mol) in DCE, diisopropylarine (186 mg, 0.0018 mol) was added and the reaction was carried out at room temperature. After 45 min, mono-N-t-BOC-1,6-diaminohexane (Fluka, Cat.No.: 15392) (0.7 g) in benzene was added and the resulting mixture was left to react for another 1 h. The product was isolated by precipitation, purified and dried by usual procedures. 4.4 g of a polymer with molecular parameters $\overline{M}_w$=4150, $\overline{M}_n$=3690 and pd=1.2 were obtained, with structure corrsponding to poly(γ-benzyl L-glutamate) with average polymerisation degree $P_n$=14, in which one end group is formed by BOC-glycine and the other by N-BOC-aminohexylamine.

Example 7

The polymer prepared according to Example 6 (0.5 g) was dissolved in DCE and the solution was cooled to 0° C. Trifluoroacetic acid (5 ml) was added and the solution was stirred at 0° C. for 2 h. After the evaporation of solvents the residue was dissolved in chloroform, extracted with a solution of NaHCO$_3$ and water and the product was isolated by precipitation (yield: 312 mg). The product was identified as a telechelic copolymer with structure corresponding to formula H-Gly-[Bzl-Glu]$_{14}$—NH—(CH$_2$)$_6$—NH$_2$.

Example 8

The telechelic polymer diamine prepared according to Example 7 (0.14 g, 0.078 mmol NH$_2$), L-lactide (0.62 g, 4.32 mmol) and tin(II) octanoate (0.029 g) were dissolved in dioxane. The mixture was kept in a sealed glass ampoule at 60° C. for 72 h. The reaction product was isolated by precipitation and dried in vacuum. The analysis of resulting polymer (yield: 94%) indicated the structure of a ABA-type block copolymer, in which blocks A are formed by.poly (lactic acid) and block B by poly(Bzl-Glu).

Example 9

A block copolymer Ac-Gly-[DDG]$_{44}$-[TCEG]$_{36}$ prepared according to Example 5 (2.0 g) was dissolved in DMF, 2-arminoethanol (980 mg, 16 mmol) was added to the solution and the reaction mixture was stirred for 4 h at ambient temperature. The polymer product was precipitated into acetone/water mixture, acidified with hydrochloric acid, and dried. The analysis of the obtained polymer (1.44 g) indicated the structure of a block copolymer composed of a lipophilic poly[DDG] block and a hydrophilic poly[N-(2-hydroxyethyl) L-glutamine] block.

Example 10

Block copolymer prepared according to Example 8 was dissolved in DMF and palladium catalyst (Pd on charcoal, Fluka) was suspended in the solution. The suspension was kept saturated with hydrogen for 72 h at ambient temperature. The catalyst was removed by filtration and the polymer was isolated from the solution by precipitation. The product was analysed by NMR spectroscopy and GPC. The product composition corresponded to a block copolymer ABA, in which block A are formed by poly(lactic acid) and block B is formed by poly(glutamic acid).

Example 11

Poly(Bzl-Asp) prepred according to Example 1 (2.28 g, 1 mmol, with respect to hydroxyethyl end groups), ε-caprolactone (4.0 g, 35 mmol) and tin(II) octanoate (0.7 mmol) were placed in a glass polymerisation ampoule and dry dioxane (3 5 ml) was added under the shield of dry nitrogen. The ampoule was sealed under vacuum and the polymerisation was carried out at 60° C. for 72 h. The polymer product was isolated by. precipitation into methanol. The resulting polymer exhibited an unimodal MWD in GPC analysis and its composition, determined by NMR analysis, corresponded to the structure of a block copolymer AB, in which block A, poly(Bzl-Asp) and block B, poly(ε-caprolactone) are connected through —O—$CH_2$—$CH_2$—NH— group.

Example 12

To a solution of $N_\alpha$,$N_\epsilon$-di-benzyloxycarbonyl-lysine NCA (0.44 g, 0.1 mmol) and $N_\epsilon$-benzyloxycarbonyl-lysine NCA (Cbz-LysNCA) (6.12 g, 2 mmol) in DCE, triethylamine (10 mg, 0.1 mmol) was added and the reaction mixture was stirred at ambient temperature. After 2 h 2-aminethanol (30 mg) was added to the mixture and the reaction was left to proceed for another 4 h. The product was isolated by precipitation. GPC and NMk analysis indicated a structure of the poly(Cbz-Lys) corresponding to formula $N_\alpha$-Cbz-[$N_{\epsilon\text{-}Cbz\text{-}Lys}$]$_{22}$-NH—$CH_2$—$CH_2$—OH.

Example 13

Poly(Cbz-Lys) with a terminal hydroxyl group prepared according to Example 12 was used as a macromolecular initiator in a ring-opening polymerisation of L-lactide catalysed by tin(II) octanoate in a procedure analogous to that of the Example 3. A block copolymer AB was obtained, composed of poly(Cbz-Lys) as A block and poly(L-lactide) as B block.

Example 14

Block copolymer [Cbz-Lys]$_{22}$-block-[L-LA]$_{72}$ prepared according to Example 13 was hydrogenated in DMF in the presence Pd catalyst. By the removal of Cbz protecting groups from the poly[Cbz-Lys] copolymer segment an amphiphilic block copolymer poly(L-lys)-block-poly(L-LA) was obtained.

Example 15

To a solution of Bzl-AspNCA (2.99 g, 12 mmol) and $N_\alpha$-FMOC-glycine NCA (Fluka, AG) (0.32 g, 1 mmol) in dry DCE, diisopropylamine (0.05 g) was added and the mixture was left to react at ambient temperature for 30 min. 2-Aminoethanol (0.3 g) was added to the solution and after additional 3 h, the polymer product was isolated by precipitation into methanol and dried. The obtained polymer was subsequently used as a macromolecular initiator in the polymerisation of L-lactide. By applying a procedure analogous to that of Example 3, a block copolymer was obtained, which was analysed as N-FMOC-Gly-[Bzl-Asp]$_{13}$—NH—$CH_2$—$CH_2$—O—[CO—$CHCH_3$—O]$_{112}$—H.

Example 16

A polymer prepred according to Example 15 (0.5 g) was dissolved in DMF (10 ml), the solution was cooled to 0° C. and piperidine (3 ml) was added. After 30 mnin of reaction at 0° C. the polymer was isolated by precipitation and dried. The product (0.21 g) was dissolved in dry DMF and $N_\alpha$,$N_\delta$,$N_\epsilon$-tri-Cbz-arginyl-N-oxy-sucinimide (0.02 g) was added and the reaction continued for 16 h. The resulting polymer product was subjected to amino-acid analysis to obtain a ratio of Arg:Gly:Asp =0.95: 1.0: 12.5, which is in agreement with the predicted structure: $N_\alpha$,$N_\delta$$N_\epsilon$-tri-Cbz-Arg-Gly-BzlAsp-[Bzl-Asp]$_{11.5}$-NH—$CH_2$—$CH_2$—O—[CO—$CHCH_3$—O]$_{112}$—H. Through a catalytic hydrogenation, analogously to the procedure described in Example 14, an amphiphilic copolymer with average composition corresponding to the structure Arg-Gly-Asp-[Asp]$_{11.5}$-NH—$CH_2$—$CH_2$—O—[CO—$CHCH_3$—O]$_{112}$—H was obtained in good yield.

Example 17

An amphiphilic block copolymer prepared according to Example 9 was dissolved in N,N-dimethylacetamide (1% solution) and dialysed against water through a dialysing membrane (Visking Dialysis Tubing, Serva, Heidelberg, Germany). The removal of the organic solvent was accompanied by association of block-copolymer molecules and a micellar solution was obtained. Dynamic light-scattering measurement provided a hydrodynamic radius of micellar particles to be $R_H$=62 nm).

Example 18

Block copolymer prepared according to Example 10 was dissolved in chloroform (1 mg/ml) and the solution was spread on a surface of water in a Lauda Langmuir-Film Balance apparatus. By means of a pressure transducer, a dependence of surface tension on the area occupied by copolymer molecules spread at the water-air interface was measured. The recorded dependence was characteristic for Langmuir molecular layers. By the analysis of this dependence and by means of electron microscopy of the film transferred on a mica support, it was possible to conclude that an organised monolayer of block-copolymer molecules was formed, in which the hydrophilic segments of copolymer, poly(Asp) are oriented towards aqueous medium and the lipophilic blocks, poly(L-LA) form a layer of compressed segments.

While this invention has been described and illustrated with reference to certain preferred embodiments thereof, those skilled in the art will appreciate that various changes, modifications and substitutions can be made therein without departing fronm the spirit of the invention. It is intended, therefore, that the invention be limited only by the scope of the claims which follow.

What is claimed is:

1. Functionalized polymers of α-amino acids of a general formula (1),

(1)

wherein X is oxygen or sulphur,

R$_1$ is a radical selected from the group consisting of C1–C20 alkyls, C2–C20 alkenyls, substituted alkyl, aryl or substituted aryl, arylalkyl and substituted arylalkyl, structure [A]$_n$ represents a poly(amino acid) chain composed of one type or a combination of more than one type of structural units selected from the group consisting of α-amino acids or their derivatives with protected functional groups, which are connected by peptide bonds in a way depicted by formula (2),

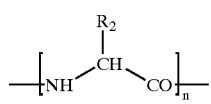
(2)

wherein R$_2$ represents the residue of respective amino acid or its derivative, n means a number of amino-acid structural units in the chain and may range from 1 to 500; Y is either OH, or a structure of formula (2a),

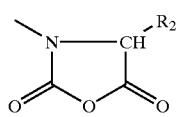
(2a)

wherein R$_2$ is H or an amino-acid residue selected from the group consisting of α-amino acids and their derivatives;

or Y is a structure of formula (3),

—Z—R$_3$—Z'—P (3)

wherein Z and Z' are either NH or O;

R$_3$ is a chemical structure selected from C2 to C20 alkyls, substituted alkyls, aryls or substitued aryls, or it is a polymer selected from the group consisting of poly (ethylene oxide), poly(propylene oxide) and polybutadiene;

P is a hydrogen or an acyl group derived from a carboxylic acid selected from the group consisting of alkanoic acids, succinic acid, maleic acid, acrylic acid, phthalic acids and cyclohexane dicarboxylic acids, or it is an acyl selected from the group consisting of compounds according to a general formula (4),

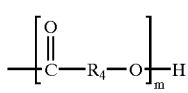
(4)

wherein R$_4$ is selected from the group consisting of C1 to C5 alkyls, CH$_2$—O—CH$_2$—CH$_2$, CH$_2$—O—CH$_2$—CH$_2$—CH$_2$, and O—(CH$_2$)$_3$—O, wherein R$_4$ may be the same in all structural units or different and the subscript m indicates a number of said structural units and may range from 2–800.

2. The polymers according to claim 1, wherein the structure [A]$_n$ is a poly(amino acid) chain composed of structural units selected either individually or in combination from the group of α-amino acids consisting of glycine, alanine, valine, leucine, isoleucine, phenylalanine, tryptophane, threonine, methionine, lysine, ornithine, arginine, histidine, serine, asparagine, glutamine, tyrosine, cysteine, aspartic acid, glutamic acid, 2,3-diaminopropionic acid, 2,4-diaminobutyric acid, and their analogues and substituted derivatives.

3. The polymers according to claim 1, wherein at least one of the structural units constituting the structure [A]$_n$ is selected from the group consisting of β-alkylesters and β-alkylamides of aspartic acid, wherein alkyl is a C1 to C18 alkyl or substituted alkyl.

4. The polymers according to claim 3, wherein at least one of the structural units constituting the structure [A]$_n$ is selected from the group consisting of β-methyl aspartate, β-cholesteryl aspartate, β-t-butyl aspartate, β-benzyl aspartate, β-allyl aspartate and β-(2,2,2-trichloroethyl) aspartate, N-(2-hydroxyethyl)asparagine, N-hydroxypropyl asparagine, and N-hydroxybutyl asparagine.

5. The polymers according to claim 1, wherein at least one of the structural units constituting the structure [A]$_n$ is selected from the group consisting of γ-alkylesters and γ-alkylamides of glutamic acid, wherein alkyl is a C1 to C18 alkyl or substituted alkyl.

6. The polymers according to claim 5, wherein at least one of the structural units constituting the structure [A]$_n$ is selected from the group consisting of γ-methyl glutamate, γ-cholesteryl glutamate, γ-t-butyl glutamate, γ-benzyl glutamate, γ-allyl glutamate and γ-(2,2,2-trichlorethyl) glutamate, N-(2-hydroxy-ethyl)glutamine, N-hydroxypropyl glutamine, N-hydroxybutyl glutamine.

7. The polymers according to claim 1, wherein at least one of the structural units constituting the structure [A]$_n$ is selected from the group consisting of N$_ε$-t-butoxycarbonyl-L-lysine, N$_ε$-benzyloxycarbonyl-L-lysine, N$_ε$-allyloxycarbonyl L-lysine, N$_ε$-phthalimido-L-lysine, N$_δ$-t-butoxycarbonyl-L-omithine, N$_δ$-benzyloxycarbonyl-L-omithine, N$_δ$-allyloxycarbonyl-L-ornithine, N$_δ$-phthalimido-L-ornithine, N$_γ$-t-butoxycarbonyl-2,4-diaminobutyric acid, N$_γ$-benzyloxycarbonyl-2,4-diaminobutyric acid, N$_γ$-allyloxycarbonyl-2,4-diaminobutyric acid, N$_γ$-phthalimido-2,4-diaminobutyric acid, N$_β$-t-butoxycarbonyl-2,3-diaminopropionic acid, N$_β$benzyloxycarbonyl-2,3-diaminopropionic acid, N$_β$-allyloxycarbonyl-2,3-diaminopropionic acid, and N$_β$-phthalimido-2,3-diaminopropionic acid.

8. The polymers according to claim 1, wherein at least one of the structural units constituting the structure [A]$_n$ is arginine or an arginine derivative substituted on the guanidine group.

9. The polymers according to claim 8, wherein at least one of the structural units constituting the structure [A]$_n$ is N$_δ$, N$_ε$-bis-benzyloxycarbonyl-L-arginine.

10. The polymers according to claim 1, wherein at least one of the structural units constituting the structure [A]$_n$ is selected from the group consisting of serine, or a serine derivative substituted at a hydroxyl group, which is selected from the group consisting of O-t-butyl serine, O-benzyl serine, O-triphenylmethyl serine (O-trityl serine), and O-allyl serine.

11. The polymers according to claim, 1, wherein R$_1$ is a radical selected from the group consisting of substituted alkyls, alkenyls, aryls and arylalkyls.

12. The polymers according to claim 11, wherein R$_1$ is methyl, allyl, phenyl, 4-nitrophenyl, 3,5-dinitrophenyl, benzyl, benzyloxyl, t-butoxyl, allyloxyl and fluorenyl-methoxyl.

13. The polymers according to claim 1, wherein P is a polymeric acyl selected from the group consisting of acyls derived from poly(L-lactide), poly(D,L-lactide), copolymers poly (L-lactide-stat-D,L-lactide), polyglycolide, copolymers poly(lactide-stat-glycolide), poly($\epsilon$-caprolactone) and copolymers containing structural units derived from $\epsilon$-caprolactone and those derived from lactide and glycolide.

14. The polymers according to claim 1, wherein the grouping $R_1$—(C=X)— in formula 1 is replaced by a hydrogen atom.

15. A method of manufacturing polymers according to claim 1, comprising a reaction of a mixture of monomers, base catalyst and initiator in an aprotic solvent for a time necessary to complete the reaction, wherein the monomer is either a single $\alpha$-amino-acid N-carboxyanhydride or a combination of N-carboxyanhydrides, and the initiator is a compound of a general formula 5,

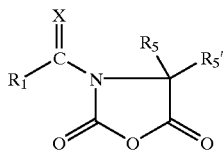

(5)

wherein X is oxygen or sulphur, $R_1$ is a radical from the group consisting of C1–C20 alkyls, C2–C20 alkenyls, substituted alkyl, aryl or substituted aryl, arylalkyl and substituted arylalkyl; $R_5$ is hydrogen, or C1 to C5 alkyl; $R_5'$ is hydrogen, or C1 to C5 alkyl, aryl, arylalkyl or substituted alkyl;

Wherein a ratio of monomer/initiator (mol/mol) ranges from about 2 to 1000, and a ratio of monomer/catalyst (mol/mol) ranges from about 1 to 500; and isolating the resulting polymer product.

16. A method according to claim 15, wherein the ratio of monomer/initiator (mol/mol) ranges from about 5 to 300 and the ratio of monomer/catalyst (mol/mol) ranges from about 5–300.

17. The method according to claim 15, wherein at least one of the monomers used either individually or in combination is N-carboxyanhydride of $\alpha$-amino acid selected from the group consisting of glycine, alanine, valine, leucine, isoleucine, phenylalanine, tryptophane, threonine, methionine, and their analogues and substituted derivatives.

18. The method according to claim 15, wherein at least one of the monomers used either individually or in combination is N-carboxyanhydride of $\alpha$-amino acid selected from the group consisting of derivatives of aspartic acid, glutamic acid, lysine, ornithine, arginine, histidine and tyrosine with protected functional groups.

19. The method according to claim 18, wherein at least one of the monomers used either individually or in combination is N-carboxyanhydride of $\alpha$-amino acid selected from the group consisting of $\beta$-alkylester and $\beta$-alkylamides of aspartic acid, wherein alkyl is a C1 to C18 alkyl or substituted alkyl.

20. The method according to claim 19, wherein at least one of the monomers used either individually or in combination is N-carboxyanhydride of $\alpha$-amino acid selected from the group consisting of $\beta$-methyl aspartate, $\beta$-cholesteryl aspartate, $\beta$-t-butyl aspartate, $\beta$-benzyl aspartate, $\beta$-allyl aspartate and $\beta$-(2,2,2-trichloroethyl)aspartate.

21. The method according to claim 18, wherein at least one of the monomers used either individually or in combination is N-carboxyanhydride of $\alpha$-amino acid selected from the group consisting of $\gamma$-alkylesters and $\gamma$-alkylamides of glutamic acid, wherein alkyl is a C1 to C18 alkyl or substituted alkyl.

22. The method according to claim 21, wherein at least one of monomers used either individually or in combination is N-carboxyanhydride of $\alpha$-amino acid selected from the group consisting of $\gamma$-methyl glutamate, $\gamma$-cholesteryl glutamate, $\gamma$-t-butyl glutamate, $\gamma$-benzyl glutamate, $\gamma$-allyl glutamate and $\gamma$-(2,2,2-trichlorethyl)glutamate.

23. The method according to claim 18, wherein at least one of the monomers used either individually or in combination is N-carboxyanhydride of $\alpha$-amino acid selected from the group consisting of $N_\epsilon$-t-butoxycarbonyl-L-lysine, $N_\epsilon$-benzyloxycarbonyl-L-lysine, $N_\epsilon$-allyloxycarbonyl-L-lysine, $N_\epsilon$-phthalimido-L-lysine, $N_\delta$-t-butoxycarbonyl-L-ornithine, $N_\delta$-benzyloxycarbonyl-L-ornithine, $N_\delta$-allyloxycarbonyl-L-ornithine, $N_\delta$-phthalimido-L-ornithine, $N_\gamma$-butoxycarbonyl-2,4-diaminobutyric acid, $N_\gamma$-benzyloxycarbonyl-2,4-diaminobutyric acid, $N_\gamma$-allyloxycarbonyl-2,4-diaminobutyric acid, and $N_\gamma$-phthalimido-2,4-diaminobutyric acid, $N_\beta$-t-butoxycarbonyl-2,3-diaminopropionic acid, $N_\beta$-benzyloxycarbonyl-2,3-diaminopropionic acid, $N_\beta$-allyloxycarbonyl-2,3-diaminopropionicacid, and $N_\beta$-phthalimido-2,3-diaminopropionic acid.

24. The method according to claim 18, wherein at least one of the monomers used either individually or in combination is N-carboxyanhydride of an arginine derivative substituted on the guanidine group.

25. The method according to claim 24, wherein at least one of the monomers is N-carboxyanhydride of $N_\delta$, $N_\epsilon$-bis-benzyloxycarbonyl-L-arginine.

26. The method according to claim 18, wherein at least one of the monomers used either individually or in combination is N-carboxyanhydride of an $\alpha$-amino acid selected from the group consisting of serine, or a serine derivative substituted at a hydroxyl group, which is selected from the group consisting of O-t-butyl serine, O-benzyl serine, O-triphenylmethyl serine, and O-allyl serine.

27. The method according to claim 15, wherein the initiator is a compound of general formula 5, wherein $R_1$ is a radical selected from the group consisting of alkyl, substituted alkyl, alkenyl, aryl and arylalkyl.

28. The method according to claim 27, wherein the initiator is a compound of general formula 5, wherein $R_1$ is a radical selected from the group consisting of methyl, allyl, phenyl, 4-nitrophenyl, 3,5-dinitrophenyl, benzyl, benzyloxyl, t-butoxyl, allyloxyl and fluorenylmethoxyl.

29. The method according to claim 15, wherein the initiator is a compound of general formula 5, wherein $R_1$ is H and $R_5'$ is a radical selected from the group consisting of 2-(benzyloxycarbonyl)ethyl, (benzyloxycarbonyl)methyl, 2-(t-butyloxycarbonyl)ethyl, butyloxy-carbonyl-methyl,4-(benzyloxy-carbonylamido)butyl,3-(benzyloxycarbonylamido)propyl, 2-(triphenylmetoxy) ethyl, 2-(t-butoxy) ethyl, 2-(benzyloxy)ethyl, 2-(allyloxy)methyl.

30. The method according to claim 15, wherein the initiator is a compound of general formula 5, wherein both $R_5$ and $R_5'$ are H.

31. The method according to claim 15, wherein the catalyst is a compound selected from the group consisting of tertiary amines and sterically hindered secondary amines.

32. The method according to claim 31, wherein the catalyst is a compound or a combination of compounds selected from the group consisting of triethylamine, tributylamine, diisopropylamine, dicyclohexylamine and N-methylmorpholine.

33. The method according to claim 15, wherein the catalyst is added into the polymerization mixture containing monomers and initiator in one dose when the reaction is started.

34. The method according to claim 15, wherein the catalyst is added into the polymerization mixture continuously or repeatedly in several doses during the reaction.

35. The method according to claim 15, wherein all the monomer, either of one type or a combination of different types, is added in one dose when the reaction is started.

36. The method according to claim 15, wherein the monomer is added to the polymerization mixture in more than one dose or continuously during the reaction, wherein each dose may contain either the same monomer or different monomers.

37. The method according to claim 15, wherein the polymerization reaction is terminated at a selected stage of monomer conversion by addition of a nucleophilic agent, which contains at least one amino or hydroxyl group.

38. The method according to claim 37, wherein the nucleophilic agent is a compound selected from the group consisting of diaminoalkanes, semi-protected diaminoalkanes and aminoalcohols.

39. The method according to claim 38, wherein the nucleophilic agent is amine selected from the group consisting of 1,2-diaminoethane, 1,3-diaminopropane, 1,4-diaminobutane, 1,5-diaminopentane, 1,6-diaminohexane, N-t-BOC-1,2-diaminoethane, N-t-BOC-1,3-diaminopropane, N-t-BOC-1,4-diaminobutane, N-t-BOC-1,5-diaminopentane, and N-t-BOC-1,6-diaminohexane.

40. The method according to claim 38, wherein the nucleophilic agent is a compound selected from the group consisting of 2-aminoethanol, 3-aminopropanol and 4-aminobutanol.

41. The method according to claim 37, wherein the nucleophilic agent is a polyether selected from the group consisting of poly(ethylene glycol), mono-methoxy-poly(ethylene glycol), poly(propylene glycol), $\alpha,\omega$-diamino-poly(ethylene oxide), $\alpha$-methoxy-$\omega$-amino-poly(ethylene oxide).

42. The method according to claim 37, wherein the nucleophilic agent is a telechelic functionalized polybutadiene derivative selected from the group consisting of $\alpha,\omega$-dihydroxy-polybutadiene, $\alpha,\omega$-diamino-polybutadiene and their substituted derivatives.

43. The method according to claim 37, wherein the resulting polymer with amine or hydroxyl end-groups is subsequently used as a macromolecular initiator in a grafting ring-opening polymerization of lactones.

44. The method according to claim 43, wherein lactone in the grafting polymerization is selected either individually or in a combination from the group consisting of glycolide, L-lactide, D,L-lactide, $\epsilon$-caprolactone, butyrolactone, valerolactone, 2,5-dioxepan-one, and trimethylene carbonate.

45. Polymers according to claim 1, wherein n ranges from about 3–200.

46. Polymers according to claim 1, wherein m ranges from about 8–300.

47. Polymers according to claim 1, wherein a ratio of monomer/initiator ranges from about 3–200.

48. Polymers according to claim 1, wherein a ratio of monomer/catalyst ranges from about 3–200.

* * * * *